Aug. 20, 1946.                J. B. LITTLE                    2,406,021
                         SEALED REED CONTACT DEVICE
                          Filed July 1, 1941           3 Sheets-Sheet 1
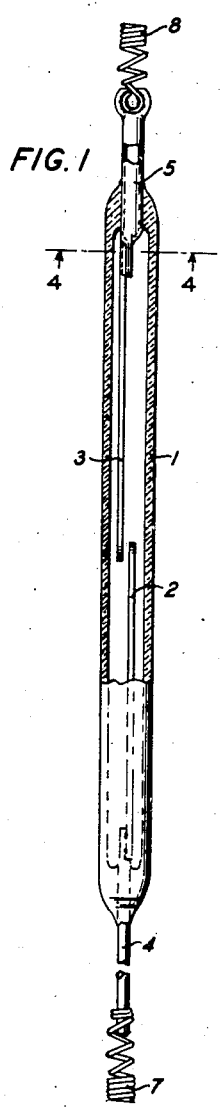
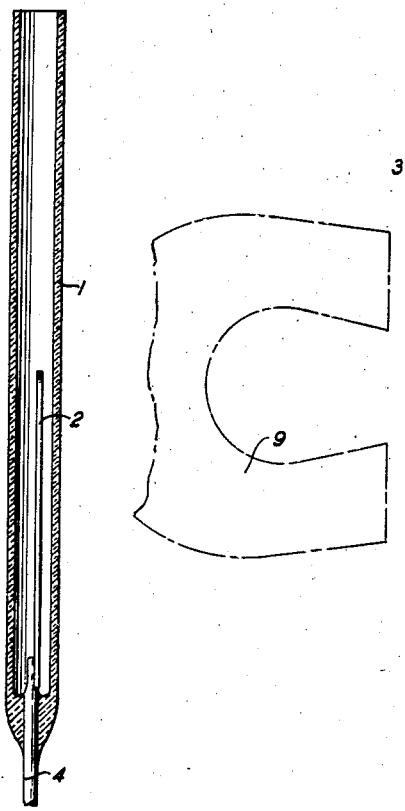
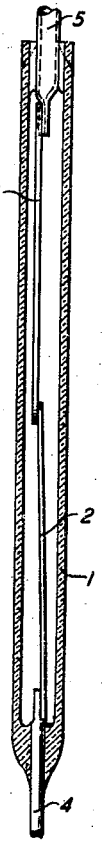
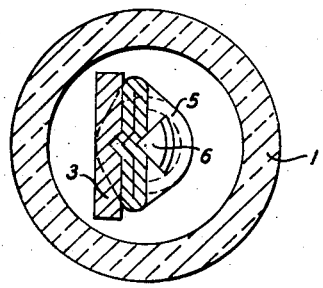
INVENTOR
J. B. LITTLE
BY
ATTORNEY Aug. 20, 1946.   J. B. LITTLE   2,406,021
SEALED REED CONTACT DEVICE
Filed July 1, 1941   3 Sheets-Sheet 2
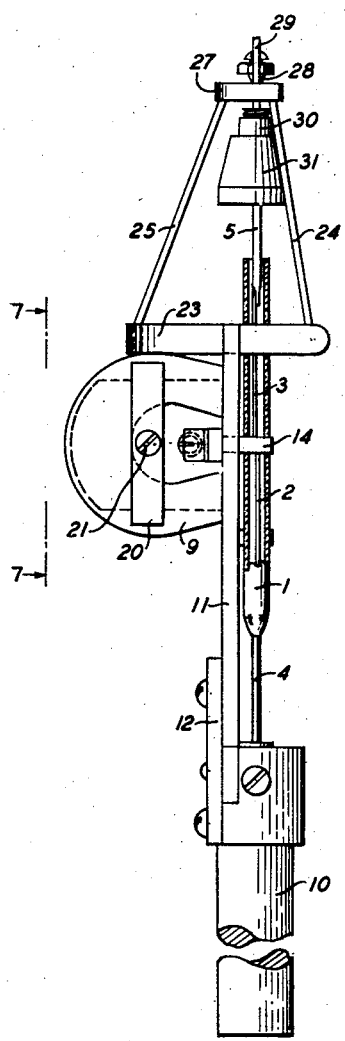
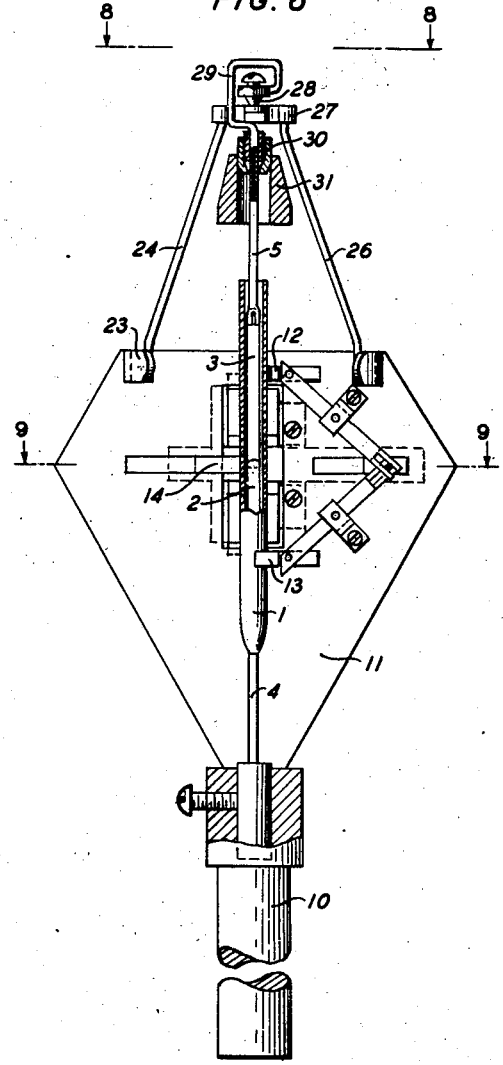
INVENTOR
J. B. LITTLE
BY
ATTORNEY Aug. 20, 1946.  J. B. LITTLE  2,406,021
SEALED REED CONTACT DEVICE
Filed July 1, 1941  3 Sheets-Sheet 3

INVENTOR
J. B. LITTLE
BY
John A. Hall
ATTORNEY

Patented Aug. 20, 1946

2,406,021

UNITED STATES PATENT OFFICE 2,406,021

SEALED REED CONTACT DEVICE

John B. Little, New York, N. Y., assignor to Bell Telephone Laboratories, Incorporated, New York, N. Y., a corporation of New York Application July 1, 1941, Serial No. 400,702

5 Claims. (Cl. 200—87)

This invention relates to electromagnetically operated switches and particularly the sealed reed type of switch in which the magnetically movable members also act as the contact device. Switches of this kind consist generally of a small glass tube with the magnetic contact reeds sealed in at opposite ends of the tube and filled with an inert gas. These contact units are then inserted into solenoids so that the air-gap of the completed relay comes at the point in the center of the coil where the greatest efficiency is obtained.

The object of the invention is to provide a method of manufacture whereby contact units of great uniformity may be produced economically. Due to the small size of the contact units, the extremely small movement of the reeds and the fact that no adjustment can be made after the reeds have been sealed into the tubes great accuracy and skill must be exercised in producing such units. But no method of manufacture is economically sound which depends on the skill of the operator and hence the object of the present invention is to provide a method which substitutes a novel operation for one which would otherwise require great skill and delicacy of handling.

In accordance with this object a first reed is sealed into one end of the tube by well known methods by which it is properly positioned. Thereafter the second reed is inserted in the tube and after being properly positioned is then restrained by an external magnetic force which is so regulated that the first reed is slightly deflected. While the two reeds are thus under magnetic restraint the second reed is sealed in and thus fixed in position. Subsequently, the magnetic restraint is removed whereupon the first reed springs away from the second by the exact amount of separation desired. This separation is thus controlled by the magnetic restraint exercised and since this can be very rigidly controlled the product of this method becomes very uniform and satisfactory and independent of the skill of the operator. In fact the method is well adapted to automatic machine working.

A feature of the invention is a jig in which the glass tube with the first reed sealed in may be clamped provided with a device for freely suspending the second reed and a magnet for aligning the two reeds in a position which will automatically produce a given separation after the second reed is sealed in and the magnetic field is removed.

Another feature of the invention is a method of manufacturing vacuum or gas-filled tubes having magnetically movable elements therein which includes the steps of stressing the movable elements by an external force and sealing in such elements while so stressed.

The drawings consist of three sheets having ten figures, as follows:

Fig. 1 is an enlarged view partly in section of a completed sealed reed contact device;

Fig. 2 is a similar view of the device partially completed;

Fig. 3 is a similar view of the device with an indication of a magnet placed substantially in position for holding the reeds during the sealing-in operation;

Fig. 4 is a greatly enlarged cross-sectional view taken along the line 4—4 of Fig. 1;

Fig. 5 is a side view of the jig employed for holding the partially completed glass sealed contact device during the sealing-in operation;

Fig. 6 is a front view of the same;

Figure 7:
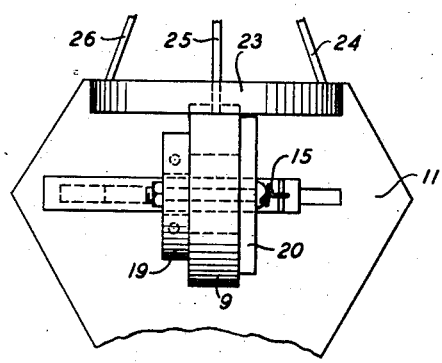
Fig. 7 is a fragmentary back view of the jig taken along the line 7—7 of Fig. 5, to illustrate the means for holding the magnet.
Figure 8:
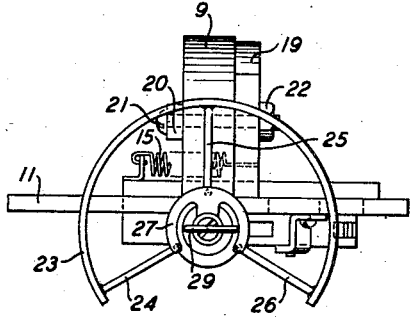
Fig. 8 is a fragmentary top view of the jig from the position indicated by the line 8—8 of Fig. 6, to show the axial position of the second reed as it is inserted in the partially completed device.

The sealed reed contact device consists of a glass envelope 1 having two reeds 2 and 3 sealed into opposite ends thereof. These reeds are of iron heat treated in an atmosphere of hydrogen so that in the final state after the tube has been pumped and then filled with an inert gas even the oxygen occluded in the metal will be removed and the contacts comprising the tips of the reeds will be particularly free of oxygen. The reeds 2 and 3 are spot-welded to lead in terminals 4 and 5 respectively. These are constructed of magnetic material, an alloy substantially of half iron and half nickel which has the property of forming a particularly good union with the glass employed to form a lasting seal. The lower lead in terminal 4 is solid but the upper terminal 5 is in the form of a tube and is employed for the usual pumping operation. Fig. 4 indicates the manner in which the tube 5 within the glass envelope is crushed to form a flat surface to which the reed 3 may be spot-welded and an aperture 6 left for pumping purposes. After the pumping has been completed the exterior end of the tube 5 is crushed and welded to form a vacuum tight seal. A wire spiral to form a connecting terminal may be secured by a soldering or a welding operation. The spiral 7 may, by way of example, be soldered to the solid terminal 4 and the spiral 8 may be welded to the terminal 5.

Figure 10:
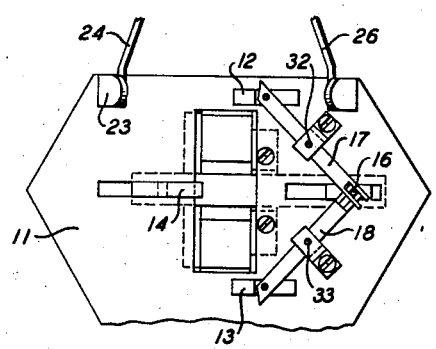
Fig. 10 is a fragmentary front view of the jig used to illustrate the said clamp.

In the process of manufacture the partially completed device shown in Fig. 2 may be produced by any well-known method by which the reed 2 may be properly oriented. Then the partially completed device of Fig. 2 is placed in the jig shown in Figs. 5 and 10, the reed 3 welded to the lead in terminal 5 suspended freely within the glass tube 1 and the two reeds placed under the influence of a magnet 9. In this state the reed 2 is strained but the reed 3 is not strained. By adjusting the position of the magnet 9, the reed 2 may be strained to a sufficient degree so that after the terminal 5 is sealed in and the position of the reed 3 is thereby fixed, the reed 2 will spring back to give the desired separation between the tips of the reeds when the device is withdrawn from the influence of the magnet 9.

Figure 9:
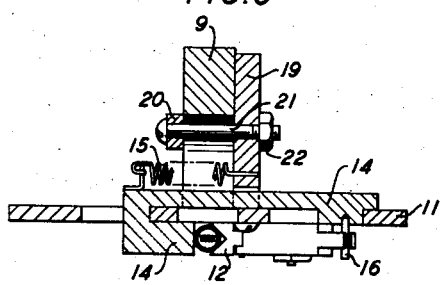
Fig. 9 is a cross-sectional view taken along the line 9—9 of Fig. 6 to illustrate the operation of the clamp for holding the partially completed device in the jig.

The jig comprises a stem 10 to which a body portion 11 is secured, as shown by a connected link 12. A clamp for holding the glass tube 1 comprises three movable jaws 12, 13 and 14. As indicated in Fig. 9, the jaw-piece 14 is normally held toward the right by a spring 15. When pushed toward the left it moves a fin 16 which rides in slots formed in the arms 17 and 18 which are pivoted at about the middle of their length and which carry at their other ends the jaw-pieces 12 and 13 respectively. Thus a push given to the piece 14 at the rear of the body portion 11 opens the jaws of the clamp so that the glass tube may be inserted therein. Thus the partially completed device may be firmly held in a given position in the jig.

The jaws 12 and 13 have an angle such that any slight variation in the glass tube diameter does not throw the tube off center since the face of the jaw 14 is flat. These angles are calculated so that the increase in the glass tubing diameter will force the axis of the tubing further away from the jaws 12 and 13 than from the flat jaw 14 in order to compensate for the decreasing lever arms between pivots 32 and 33 and the fin 16 as the jaws 12 and 13 are opened further. For the minimum size tubing the distance between the pivots 32 and 33 and the fin 16 equals the distance between the pivots 32 and 33 and the jaws 12 and 13. For larger size tubing the distance between the pivots 32 and 33 and the fin 16 is less than the distance between the pivots 32 and 33 and the jaws 12 and 13. By the proper choice of the jaw angle the axis of the largest tube can be made to coincide with that of the smallest.

A mounting piece 19 secured to the body portion 11 serves as a means to adjustably clamp the magnet 9 in position by a strap 20 and a bolt 21 and nut 22. A tripod arrangement consisting of a band 23 and three legs 24, 25 and 26 serves to hold a pivot mounting 27 so that the pivot socket point will be exactly on the axis of the clamped contact device. A pivot point 28 has a mounting 29 attached thereto and bent in such manner that the axis of the chuck 30 will coincide with the axis of the clamped contact device. The terminal 5 is clamped in the chuck 30 and is weighted by the piece 31 so that the assembly of the terminal 5 and the reed 3 will be freely suspended in the desired position. When so assembled and the reeds positioned as indicated in Fig. 3, the upper end of the glass tube 1 is heated and a seal formed to the terminal 5. After cooling the contact device is removed from the jig and is ready for further manufacturing operations, including pumping, sealing of the tube 5 and placement of the coiled terminals 7 and 8.

What is claimed is:

1. The method of manufacturing sealed tubes having magnetically movable elements therein which consists of securing a tube with one element sealed therein, suspending a second element in substantially its ultimate position, applying a magnetic field to said element to strain said first element by an amount equal to the desired final separation of said elements and sealing in said second element while said elements are under the influence of said magnetic field.

2. The method of manufacturing tubes having magnetically movable reeds sealed in the opposite ends thereof which consists of securing a tube with one reed sealed in one end thereof, freely suspending a second reed in substantially its ultimate position in said tube through the other end thereof, applying a magnetic field to said reeds sufficient to hold said reeds together and to strain said first reed by an amount equal to the desired final separation of said reeds and sealing in said second reed while said reeds are under the influence of said magnetic field.

3. A jig for use in manufacturing sealed tubes having magnetically movable elements therein comprising a chuck for securing a tube with one element sealed therein, a pivot in line with the axis of the said secured tube, a suspension element for resting on said pivot and for holding a second of said elements freely suspended in substantially its ultimate position in said tube and a magnet for holding said elements together with said first element slightly strained, whereby the parts of said tube device are held against movement while said second reed is sealed in.

4. The method of manufacturing tubes having magnetically movable reeds sealed in the opposite ends thereof which consists of securing a tube with one reed sealed in one end thereof, freely suspending a second reed in substantially its ultimate position in said tube through the other end thereof, applying a magnetic field to said reeds sufficient to hold said reeds together and to cause a lateral deflection of said first reed by an amount equal to the desired final separation of said reeds and sealing in said second reed while said reeds are under influence of said magnetic field.

5. The method of manufacturing sealed tubes having magnetically movable elements therein which consists of securing a tube with one element fixed therein, suspending a second element in substantially its ultimate position, holding said fixed element and said suspended element together, straining said fixed element from its normal position by an amount equal to the desired final separation of said elements and fixing said second element in said tube while said elements are so held together with said fixed element under strain.

JOHN B. LITTLE.